United States Patent
Bourne

(10) Patent No.: US 6,733,836 B2
(45) Date of Patent: May 11, 2004

(54) VITREOUS SURFACE AND COATING PROCESS THEREFORE

(76) Inventor: Arthur Bourne, 521 South Road, Regency Park 5010 South Australia (AU)

( * ) Notice: Subject to any disclaimer, the term of this patent is extended or adjusted under 35 U.S.C. 154(b) by 63 days.

(21) Appl. No.: 10/225,777

(22) Filed: Aug. 22, 2002

(65) Prior Publication Data

US 2003/0054106 A1 Mar. 20, 2003

Related U.S. Application Data

(63) Continuation-in-part of application No. 09/701,524, filed on Jan. 28, 2000, now abandoned.

(51) Int. Cl.⁷ .............................. B05D 3/04; B05D 3/10

(52) U.S. Cl. ..................... 427/307; 427/337; 427/340

(58) Field of Search ........................... 427/154, 255.11, 427/255.14, 299, 307, 314, 337, 340, 444, 445; 215/400; 134/2, 3, 26, 28, 29, 38

(56) References Cited

U.S. PATENT DOCUMENTS

| 4,093,759 A | * | 6/1978 | Otsuki et al. ............... 428/34.7 |
| 4,267,239 A | * | 5/1981 | Thankachan et al. .... 428/425.1 |
| 4,324,601 A | * | 4/1982 | Dembicki et al. ............ 156/69 |
| 4,420,578 A | * | 12/1983 | Hagens et al. ............... 524/322 |

FOREIGN PATENT DOCUMENTS

| JP | 54-54124 A | * | 4/1979 | ........... C03C/17/32 |
| WO | WO 99/62645 A1 | * | 12/1999 | ............ B05D/3/10 |

* cited by examiner

Primary Examiner—Shrive P. Beck
Assistant Examiner—William Phillip Fletcher, III
(74) Attorney, Agent, or Firm—John E. Vandigriff

(57) ABSTRACT

A method of removing a polyethylene coating from a glass surface includes the steps of contacting the glass surface with a solution of ammonium bifluoride ($NH_4HF_2$), rinsing the contacted surface with one or more rinses, and drying the surface. The thickness of the polyethylene slip coating applied to most commercial glass bottles is in the range 75–100 $\mu$m. The coating is removed by the process outlined above sufficiently to allow the application of an adherent decorative coating to the surface.

13 Claims, No Drawings

VITREOUS SURFACE AND COATING PROCESS THEREFORE

This application is a continuation-in-part of Ser. No. 09/701,524, filed Jan. 28, 2000, now abandoned.

FIELD OF THE INVENTION

The present invention relates to a composition and a method for removing polymeric coatings from glass container surfaces and the subsequent application of a decorative coating to the cleaned surface.

The composition and process of the present invention find a particular application in the removal of polyethylene coatings applied to glass surfaces.

BACKGROUND OF THE INVENTION

Glass containers such as food jars and bottles for wine and other beverages are manufactured in vast numbers. During the manufacturing process it is common practice for the outer surface of the glass to receive a final coating with a slip agent which results in the glass having a low friction surface, enabling greater ease of handling of the final product.

The slip agent is applied in the form of a coating typically consisting of a polyethylene film which is applied to the glass surface following treatment with a tin oxide primer. Without such a slip coating the surface of the glass is relatively rough with a high coefficient of friction and adjacent surfaces rubbing against one another cling together. This can produce an unacceptable degree of scuffing of a surface, and also causes difficulty with handling large numbers of glass items. Moreover, the scuffed glass surface has an unattractively rough appearance.

Following treatment with the coating, adjacent surfaces glide freely over each other thereby removing the difficulties in handling noted above. The glass, furthermore, has a more attractive scuff free appearance which is generally preferred. The scuffing of the bottles has also been found to have a detrimental effect on the ultimate strength of the bottles. There are therefore many sound reasons for the adoption of the coating process by glass manufacturers.

Unfortunately, a glass surface coated with the aforementioned slip agent becomes unreceptive to further treatment, and it is extremely difficult to form a secure bond between any further transparencies, printing, painting or coating material applied to the glass. This lack of adherence of subsequent coatings applied to the glass effectively limits the decorative finishes which can be applied to the glass which would be commercially acceptable.

For example, bottle transfers or printing would not remain intact on the glass during rough handling and therefore would be rejected as a commercial proposition.

For those wishing to treat glass in such a decorative way it would obviously be advantageous either to be able to remove the coating, or simply to be able to use glass bottles to which no coating have been applied.

This latter route is unfortunately not open to glass decorators as glass manufacturing companies have been most reluctant to produce uncoated glass, principally it is thought because of the difficulties found in handling glass products without the coating. As observed above the uncoated glass items tend to cling to one another. Moreover, the economies of glass manufacture are such that even should such a product be produced, to make the process cost effective very substantial numbers of bottles would have to be produced. For these reasons the use of glass created without a slip coating has been abandoned.

Therefore, attempts have been made to remove the slip coating immediately prior to the application of a decorative finish. Current technology for the removal of the slip coating involves exposing the coated bottles to high temperatures in excess of 5000 C. for lengthy time periods, for example, more than 45 minutes. This process, in spite of the high energy requirements has not been satisfactory, as it does not totally remove the slip coating which results in poor bonding between the glass surface and any subsequently applied decorative coating.

There is proposed in the present invention a composition and method whereby the polymeric coating applied as a slip coating to vitreous surfaces can be chemically removed.

SUMMARY OF THE INVENTION

Therefore, according to a first aspect of the present invention there is provided a method of removing a polyethylene coating from a vitreous surface characterized in that the method comprises the steps of:

i. contacting the vitreous surface with a solution of ammonium bifluoride ($NH_4HF_2$);

ii. rinsing the contacted surface with one or more rinses; and iii. drying the surface.

The thickness of the polyethylene slip coating applied to most commercial glass bottles is in the range 75–100 $\mu$m. The coating is removed by the process outlined above sufficiently to allow the application of an adherent decorative coating to the surface.

The use of the process provides a number of advantages when compared with the baking off process outlined above. The process is considerably less energy intensive and does not expose the surface to the high and possibly damaging temperatures which are used in the baking off process.

The selection of ammonium bifluoride provides advantages over other potential glass cleaning agents, for example, hydrofluoric acid ($H_2F_2$). Hydrofluoric acid attacks glass surfaces very aggressively, to the extent that it would not be possible to remove the polyethylene coating off a glass surface without additionally dissolving a portion of the article itself. This could possibly be detrimental to the structure and strength of the bottle. It has been found that the surface of the glass is affected only to a limited extent by the solutions used in the process of the present invention. There are further disadvantages to the use of hydrofluoric acid relating to difficulties in handling, storage and waste disposal of the material.

Preferably, the solution of ammonium bifluoride is an aqueous solution, the ammonium bifluoride being present in a concentration of 2–10% weight for weight, and more preferably in the weight range 4 to 8% weight for weight.

Preferably, the solution of ammonium bifluoride is maintained in contact with the surface to be cleaned for a period of 5–60 seconds. Preferably, the ammonium bifluoride solution is maintained at a temperature of between 25 and 500 C.

Typically, following contact with the ammonium bifluoride solution the surface undergoes sufficient rinsing in the rinsing steps to ensure that all of the coating loosened in the contacting step is removed, and that no residue remains. It has been found in practice that film residue and bifluoride solution can be satisfactorily removed with several spray rinses for a period of between 5 and 90 seconds at a pressure of between 20–200 kPa at a flow rate of 1–5 litres of rinse water per bottle per minute (in the case of standard wine bottles). This is followed by a standing period to allow all waste material to drain prior to drying.

The drying stage can be conducted at ambient temperature, and preferably includes a source of high velocity low pressure air.

In a further aspect of the present invention there is provided a method of applying a decorative coating to a vitreous surface comprising the steps of;

i. contacting the vitreous surface with a solution of ammonium bifluoride ($NH_4HF_2$);
 ii. rinsing the contacted surface with one or more rinses;
 iii. drying the surface;
 iv. applying a curable liquid polymerisable coating to the surface; and
 v. exposing the coated surface to a catalyst to thereby polymerise the coating material.

The polymerisable coating material is preferably a polyurethane pre-polymer curable at room temperatures.

The pre-polymer coating material can be applied in a single stage as an atomised mixture of the pre-polymer with an appropriate vaporous catalytic amine bearing carrier gas. Alternatively, the pre-polymer coating material can be applied to the surface in a spraying process and subsequently cured by exposing the coated surface to a catalyst bearing vapour in a separate curing stage.

In a particularly preferred embodiment the polyurethane pre-polymer coating is applied in the form of a single component moisture curable liquid prepolymer. The pre-polymer coating may contain, in addition to an isocyanate pre-polymer, other components such as pigments, solvents, and slip agents (silicones) and adhesion promoters. Preferably, the polymer is applied in a spraying process in which the liquid pre-polymer is coated onto the surface. The curing of the polymer can be achieved in a catalyst vaporous chamber having a humidity of up to 40–70% and containing an amine catalyst vapour, at a concentration of 1000–3000 ppm~ and a temperature of 25–400 C. Typically, a polyurethane coating would need to be exposed to the catalyst vapour for a minimum of 50 seconds and subsequently allowed to cure for a minimum of 4 minutes. In the catalyst vapour chamber it is advantageous if the catalyst vapour is circulated so as to effectively bombard the surface coating with catalyst vapour.

The surface coating produced by this process is typically 15–20 $\mu$m thick and, as described below, forms a secure bond to a glass surface for use as a bottle coating. Decorative colours and finishes can be incorporated into the coating. The coating is also screen printable.

The effectiveness of the removal process can be gauged by comparing the adhesion of decorative coatings applied to bottles which have not undergone the cleaning process described hereinabove with the adhesion of a coating on bottles which have been through a cleaning process.

DESCRIPTION OF PREFERRED EMBODIMENT

The effectiveness of the removal process of the present invention was tested in a number of laboratory trials and in the field. Simulation tests were carried out on standard wine bottles subjected to the following treatment regimes:

(a) No glass coating removal polyurethane coating applied; and (b) Glass coating removal conducted polyurethane coating applied.

The glass coating removal process was carried out using a 5% ammonium bifluoride solution in which the bottles were immersed for approximately 15 seconds at 350 C. The bottles were subsequently subjected to several spray rinses for up to 60s at a water pressure of 20–200 kPa and a flow rate of 1–5 L of water per bottle per minute.

The bottles were dried at room temperature in a high velocity low pressure air stream.

The polyurethane coating was applied to bottles in both groups (a) and (b). A liquid pre-polymer was applied to each bottle surface the pre-polymer being subjected to airing in a catalyst vapour to form a polyurethane surface coating of 15–20 microns over the bottle surface. The bottles were allowed to stand overnight before testing.

Transport simulation tests were carried out to both groups of bottles.

Bottles in group (a) were found to have a lacerated coating at the bottle/bottle and bottle/packaging contact points during the first hour of testing. The bottles in group (b) were found to have a coating intact after 3 hours. This is an acceptable industry benchmark.

A simple laboratory crosshatch adhesion test was also carried out on the two groups, the test being carried out in accordance with Australian Standard AS1580.4Q8.4-1993 Adhesion (cross-cut). Removal of the coating on the tape indicates loss of adhesion between the bottle and the coating. The adhesion rating measured for the bottles in group (a) were recorded as having an adhesion loss of greater than 35%, whereas those in group (b) had an adhesion loss of 0%.

Modifications and variations of the present invention such as would be apparent to a skilled addressee are deemed to be within the scope of the invention. The examples are used for purposes of illustration only and should not be taken as limiting the scope of the invention.

What is claimed is:

1. A method of applying a decorative coating to an external surface of a glass container, said method including the steps of:

contacting the vitreous surface with an aqueous solution of ammonium bifluoride to thereby remove a slip coating applied to the container;

rinsing the contacted surface;

drying the rinsed surface;

applying a curable liquid polymerisable polyurethane coating to the vitreous surface; and, exposing the coated vitreous surface to an amine catalyst vapour to thereby polymerise the liquid polyurethane to form the decorative coating.

2. The method according to claim 1, wherein the ammonium bifluoride is present in a concentration range 2–10% w/w.

3. The method according to claim 1, wherein the ammonium bifluoride is present in a concentration range 4–8% w/w.

4. The method according to claim 1, wherein the at the ammonium bifluoride solution is contacted with the container surface for 5–60 seconds.

5. The method according to claim 1, wherein that the ammonium bifluoride is maintained at a temperature of 25–50 C.

6. The method according to claim 1, wherein the rinsing step includes at least one spray rinse operating for a period of between 5 and 90 seconds.

7. The method according to claim 1, wherein the rinsing step includes at least one spray rinse operating at a pressure of from 20 to 200 kPa.

8. The method according to claim 1, wherein the vitreous surface is a glass bottle, and that the rinsing step includes at least one spray rinse operating at a flow rate of from 1 to 5 litres per bottle per minute.

9. The method according to claim 1, wherein the drying step is carried out at ambient temperatures using an air stream.

10. The method according to claim 1, wherein the amine catalyst vapour is present at 1000–3000 ppm.

11. The method according to claim 1, wherein the catalyst vapour is present in a chamber having a relative humidity of 40–70%.

12. The method according to claim 1, wherein the amine catalyst vapour is used at approximately 25–40 C.

13. A method of applying a decorative coating to an external surface of a glass container, said method including the steps of:

removing a slip coating on the vitreous surface by contacting with a solution of ammonium bifluoride;

rinsing the contacted surface;

drying the rinsed surface at ambient temperatures using an air stream;

applying a curable liquid polymerisable coating to the vitreous surface; and exposing the coated vitreous surface to an amine catalyst vapour to thereby polymerise the liquid to form the decorative coating.

* * * * *